United States Patent
Urbanek

(10) Patent No.: US 10,721,520 B2
(45) Date of Patent: Jul. 21, 2020

(54) ALLOCATING DIGITAL VIDEO RECORDER STORAGE

(71) Applicant: ARRIS Enterprises LLC, Suwanee, GA (US)

(72) Inventor: Scott A. Urbanek, Flowery Branch, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/342,099

(22) Filed: Nov. 2, 2016

(65) Prior Publication Data

US 2018/0124455 A1 May 3, 2018

(51) Int. Cl.
| | |
|---|---|
| *H04N 21/433* | (2011.01) |
| *H04N 21/4147* | (2011.01) |
| *H04N 21/4335* | (2011.01) |
| *H04N 21/472* | (2011.01) |
| *H04N 5/76* | (2006.01) |

(52) U.S. Cl.
CPC .......... *H04N 21/4334* (2013.01); *H04N 5/76* (2013.01); *H04N 21/4147* (2013.01); *H04N 21/4335* (2013.01); *H04N 21/472* (2013.01)

(58) Field of Classification Search
CPC ............. H04N 21/433; H04N 21/4147; H04N 21/4335; H04N 21/472; H04N 5/765; H04N 21/4332
See application file for complete search history.

(56) References Cited

U.S. PATENT DOCUMENTS

| | | | | |
|---|---|---|---|---|
| 8,826,351 | B2 * | 9/2014 | Li | H04N 5/76 386/295 |
| 2004/0006698 | A1 * | 1/2004 | Apfelbaum | G11B 19/00 713/182 |
| 2005/0232210 | A1 * | 10/2005 | Karaoguz | H04L 29/06027 370/338 |
| 2009/0100478 | A1 * | 4/2009 | Craner | G11B 19/00 725/87 |
| 2009/0210898 | A1 * | 8/2009 | Childress | H04H 60/46 725/34 |
| 2010/0064314 | A1 * | 3/2010 | Li | H04N 5/76 725/38 |
| 2010/0272413 | A1 * | 10/2010 | Bhogal | H04N 5/765 386/248 |

(Continued)

*Primary Examiner* — John R Schnurr
(74) *Attorney, Agent, or Firm* — Buchanan Ingersoll & Rooney PC

(57) ABSTRACT

Methods, systems, and computer readable media may be operable to facilitate the allocation of digital video recorder storage. Storage for a device such as a digital video recorder may be partitioned into a plurality of segments, and each segment may be allocated to a specified user. The device may be configured to allocate a specified amount or percentage of storage to each one of a plurality of users. When a request to record a piece of content is received by the device, the device may identify the user requesting the recording, and the piece of content may be recorded and stored within a portion of device storage that is allocated to the user. If there is not enough room in storage allocated to the user to store the requested content, the device may identify and remove one or more recordings from the portion of storage allocated to the user.

11 Claims, 6 Drawing Sheets

(56) References Cited

U.S. PATENT DOCUMENTS

2014/0115640 A1\* 4/2014 Walsh ............... G06F 17/30817
                                                                725/93
2015/0350712 A1\* 12/2015 Sarosi ................ H04N 21/2747
                                                                725/28

\* cited by examiner

ALLOCATING DIGITAL VIDEO RECORDER STORAGE

TECHNICAL FIELD

This disclosure relates to the allocation of digital video recorder storage.

BACKGROUND

Media storage may be provided to a subscriber in the form of a digital video recorder (DVR) or a network DVR (nDVR). Typically, when media storage space is full, a default content removal method is used to remove content in order to make room for a new recording. For example, the oldest recording stored may be selected and removed from the media storage. Alternatively, a requested recording may not be recorded if there is insufficient space in media storage and content within media storage is precluded from being removed due to a content protection setting.

In many cases, media storage is shared by a plurality of different users (i.e., family members, roommates, etc.), and each user may be responsible for initiating and maintaining different recordings stored on the media storage. When there is insufficient space on the shared media storage, one user's recording request may be denied due to the storage being occupied by recordings initiated or maintained by other users, or a recording saved by one user may be removed from the shared storage when another user's recording request causes the storage capacity to be exceeded. Therefore, a need exists for methods and systems operable to facilitate a management of media storage that is based on an identification of a user associated with a recording or recording request.

BRIEF DESCRIPTION OF THE DRAWINGS

Like reference numbers and designations in the various drawings indicate like elements.

DETAILED DESCRIPTION

Figure 1:
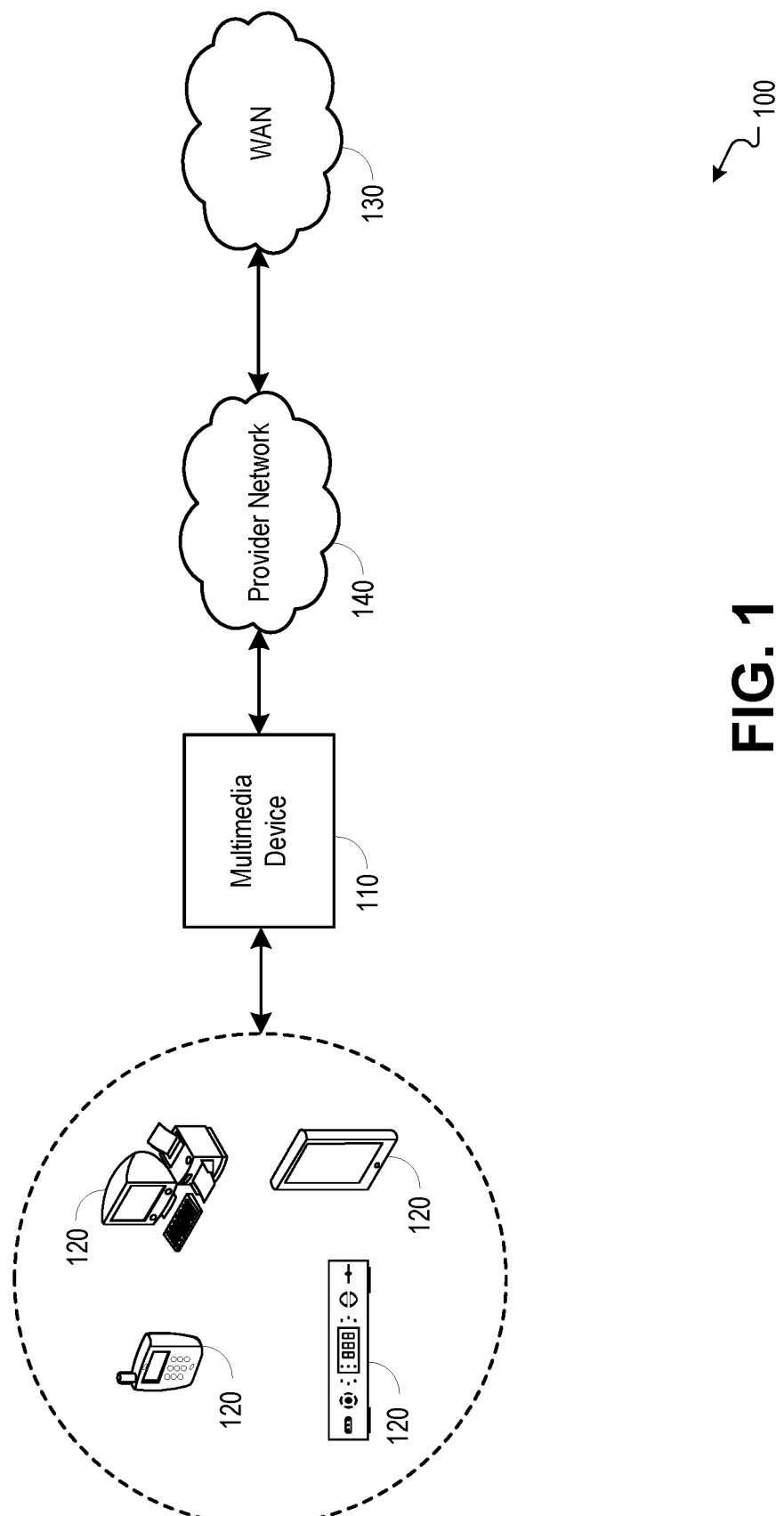
FIG. 1 is a block diagram illustrating an example network environment operable to facilitate the allocation of digital video recorder storage.

It is desirable to provide methods and systems operable to facilitate user-based storage of media. Methods, systems, and computer readable media may be operable to facilitate the allocation of digital video recorder storage. Storage for a device such as a digital video recorder may be partitioned into a plurality of segments, and each segment may be allocated to a specified user. The device may be configured to allocate a specified amount or percentage of storage to each one of a plurality of users. When a request to record a piece of content is received by the device, the device may identify the user requesting the recording, and the piece of content may be recorded and stored within a portion of device storage that is allocated to the user. If there is not enough room in storage allocated to the user to store the requested content, the device may identify and remove one or more recordings from the portion of storage allocated to the user.

It should be understood that the methods, systems, and computer readable media described herein may work equally well with either in-home DVR or with network-based DVR (e.g., nDVR). Network DVR (nDVR) storage has the benefit of keeping recorded media in the cloud. In-home DVR may be supplemented with nDVR, thereby allowing recordings to be moved to cloud storage.

An embodiment of the invention described herein may include a method comprising: (a) receiving a request to create a recording of a piece of content; (b) identifying a user associated with the request; (c) based on a determination of the size of available storage in a portion of media storage allocated to the user, determining whether sufficient space is available to store one or more segments of the recording of the piece of content in the portion of media storage allocated to the user; and (d) if sufficient space is not available to store one or more segments of the recording of the piece of content in the portion of media storage allocated to the user: (i) identifying for removal, one or more recordings stored in the portion of media storage allocated to the user; and (ii) removing the identified one or more recordings from the portion of media storage allocated to the user; and (e) storing the recording of the piece of content in the media storage allocated to the user.

According to an embodiment of the invention, the media storage comprises digital video recorder (DVR) storage.

According to an embodiment of the invention, the media storage comprises network digital video recorder (nDVR) storage.

According to an embodiment of the invention, the user associated with the request is identified based on an identifier carried by the request.

According to an embodiment of the invention, the user associated with the request is identified based on a received user input of an identifier associated with the user.

According to an embodiment of the invention, the user associated with the request is identified based on an identification of a device from which the request was received and an identification of a user associated with the device.

According to an embodiment of the invention, the portion of media storage allocated to the user is established based upon user input allocating a portion of the media storage to each one of a plurality of users.

According to an embodiment of the invention, the determination whether sufficient space is available to store one or more segments of the recording of the piece of content in the portion of media storage allocated to the user is made after initiating the storing of the recording of the piece of content to the portion of media storage allocated to the user.

According to an embodiment of the invention, determining whether sufficient space is available to store one or more segments of the recording of the piece of content in the portion of media storage allocated to the user comprises, comparing an amount of media storage allocated to the user that is currently used to a predetermined threshold.

An embodiment of the invention described herein may include an apparatus comprising: (a) an interface configured to be used to receive a request to create a recording of a piece of content; (b) one or more modules configured to: (i) identify a user associated with the request; (ii) based on a determination of the size of available storage in a portion of media storage allocated to the user, determine whether sufficient space is available to store one or more segments of the recording of the piece of content in the portion of media storage allocated to the user; and (iii) if sufficient space is not available to store the one or more segments of the recording of the piece of content in the portion of media storage allocated to the user: (1) identify for removal, one or more recordings stored in the portion of media storage allocated to the user; and (2) remove the identified one or more recordings from the portion of media storage allocated to the user; and (c) store the recording of the piece of content in the media storage allocated to the user.

An embodiment of the invention described herein may include one or more non-transitory computer readable media having instructions operable to cause one or more processors to perform the operations comprising: (a) receiving a request to create a recording of a piece of content; (b) identifying a user associated with the request; (c) based on a determination of the size of available storage in a portion of media storage allocated to the user, determining whether sufficient space is available to store the recording of the piece of content in a portion of media storage allocated to the user; and (d) if sufficient space is not available to store the recording of the piece of content in the portion of media storage allocated to the user: (i) identifying for removal, one or more recordings stored in the portion of media storage allocated to the user; and (ii) removing the identified one or more recordings from the portion of media storage allocated to the user; and (e) storing the recording of the piece of content in the media storage allocated to the user.

FIG. 1 is a block diagram illustrating an example network environment 100 operable to facilitate the allocation of digital video recorder storage. In embodiments, a multimedia device 110 may be configured to provide multimedia services to one or more client devices 120. The multimedia device 110 may include a multimedia or residential gateway, a set-top box (STB), a digital video recorder (DVR) or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network (e.g., a local area network (LAN), a wireless local area network (WLAN), a personal area network (PAN), etc.). The multimedia device 110 may receive services from and may communicate with an upstream wide area network (WAN) 130 through a connection to a provider network 140. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), ZigBee etc.) may be used to deliver communications between a multimedia device 110 and client device 120. It should be further understood that a client device 120 may be physically connected to a multimedia device 110.

A multimedia device 110 may output live or linear content to a client device 120 as the content is received at the multimedia device 110, or the multimedia device 110 may store content and output the stored content to a client device 120 at a later time. For example, content may be transcoded and stored at the multimedia device 110, wherein the content is conditioned or transcoded into a format that is compatible with one or more client devices 120.

In embodiments, a multimedia device 110 may include storage for storing recorded pieces of content. The multimedia device 110 may be configured to allocate portions of the storage to various uses or users. For example, the multimedia device 110 may provide a user interface that facilitates a user configuration of storage allocation. Through the user interface, a user may allocate a certain portion (e.g., certain amount or percentage) of storage (e.g., DVR storage of the multimedia device 110) to each of one or more potential users/viewers of the multimedia device 110. In response to the user configuration of storage allocation, the multimedia device 110 may partition segments of storage, wherein each segment is assigned to a user and sized according to the storage allocation given to the assigned user. It should be understood that nDVR storage may be likewise partitioned and allocated to each of a plurality of users.

In embodiments, when a multimedia device 110 receives a request from a user to record and store a piece of content at the multimedia device 110, the multimedia device 110 may, if necessary, make room for the piece of content by removing one or more recordings that are stored in storage (e.g., DVR storage, nDVR storage, etc.) allocated to the user from which the recording request was received. If there is not enough room in storage allocated to the user to store the requested piece of content, the multimedia device 110 may identify one or more pieces of content for removal from the storage allocated to the user. For example, the multimedia device 110 may identify and remove the oldest pieces of content from the storage allocated to the user. Thereby, the recording of the requested piece of content does not cause content recorded by other users to be removed from DVR storage. It should be understood that the multimedia device 110 may be configured to identify pieces of content for removal from storage based on various other criteria (e.g., user preferences or favorites, size of content, type of content, etc.).

Figure 2:
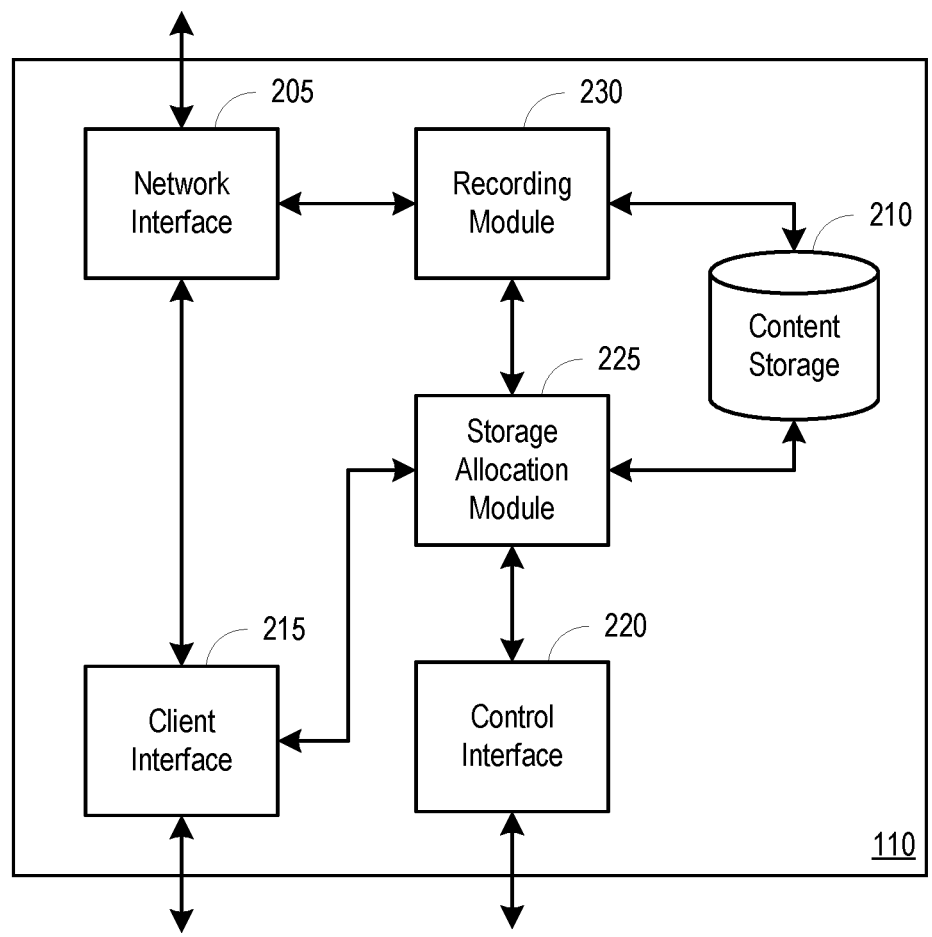
FIG. 2 is a block diagram illustrating an example multimedia device operable to facilitate the allocation of digital video recorder storage.

FIG. 2 is a block diagram illustrating an example multimedia device 110 operable to facilitate the allocation of digital video recorder storage. The multimedia device 110 may include a network interface 205, content storage 210, a client interface 215, a control interface 220, a storage allocation module 225, and a recording module 230. The multimedia device 110 may include a multimedia or residential gateway, a set-top box (STB), or any other device configured to receive, store, and/or deliver multimedia content to one or more client devices 120 of FIG. 1.

In embodiments, the multimedia device 110 may communicate with one or more client devices 120 over a wired or a wireless connection through the client interface 215.

The multimedia device 110 may output content and/or other services to client devices 120 through the client interface 215 and may receive requests for content and/or other upstream communications through the client interface 215. It should be understood that the client interface 215 may include various wired and/or wireless interfaces using various protocols and/or standards (e.g., Wi-Fi, multimedia over coax alliance (MoCA), ZigBee, Ethernet, etc.) to deliver communications between a multimedia device 110 and client device(s) 120. For example, the multimedia device 110 may communicate with one or more client devices 120 over a local network.

In embodiments, content may be received at the multimedia device 110 from an upstream network (e.g., provider network 140 of FIG. 1, WAN 130 of FIG. 1, etc.) through the network interface 205. Communications and services received through the network interface 205 may be forwarded to one or more client devices 120 through the client interface 215. For example, content streams (e.g., live or linear content, VoD content, recorded content, etc.) may be recorded by a recording module 230 and stored at content storage 210 (e.g., DVR storage), and/or the content streams may be forwarded to one or more client devices 120 through the client interface 215.

In embodiments, the storage allocation module 225 may be configured to allocate portions of the content storage 210 to various uses or users. For example, the storage allocation module 225 may provide a user interface that facilitates a user configuration of storage allocation. Through the user interface, a user may allocate a certain portion (e.g., certain amount or percentage) of content storage 210 to each of one or more potential users/viewers of the multimedia device 110. The user interface may be output to a display through the client interface 215 and a user may interact with the user interface through the control interface 220 (e.g., user requests may be received at the control interface 220 from a control device (e.g., RCU)). In response to the user configuration of storage allocation, the storage allocation module 225 may partition segments of content storage 210, wherein each segment is assigned to a user and sized according to the storage allocation given to the assigned user.

In embodiments, when the multimedia device 110 receives a request from a user to record and store a piece of content at the content storage 210, the storage allocation module 225 may, if necessary, make room for the piece of content by removing one or more recordings that are stored in a portion of the content storage 210 that is allocated to the user from which the recording request was received. If there is not enough room in storage allocated to the user to store the requested piece of content, the storage allocation module 225 may identify one or more pieces of content for removal from the portion of the content storage 210 that is allocated to the user. For example, the storage allocation module 225 may identify and remove the oldest pieces of content from the storage allocated to the user. It should be understood that the storage allocation module 225 may be configured to identify pieces of content for removal from content storage 210 based on various other criteria (e.g., user preferences or favorites, size of content, type of content, etc.).

Figure 3:
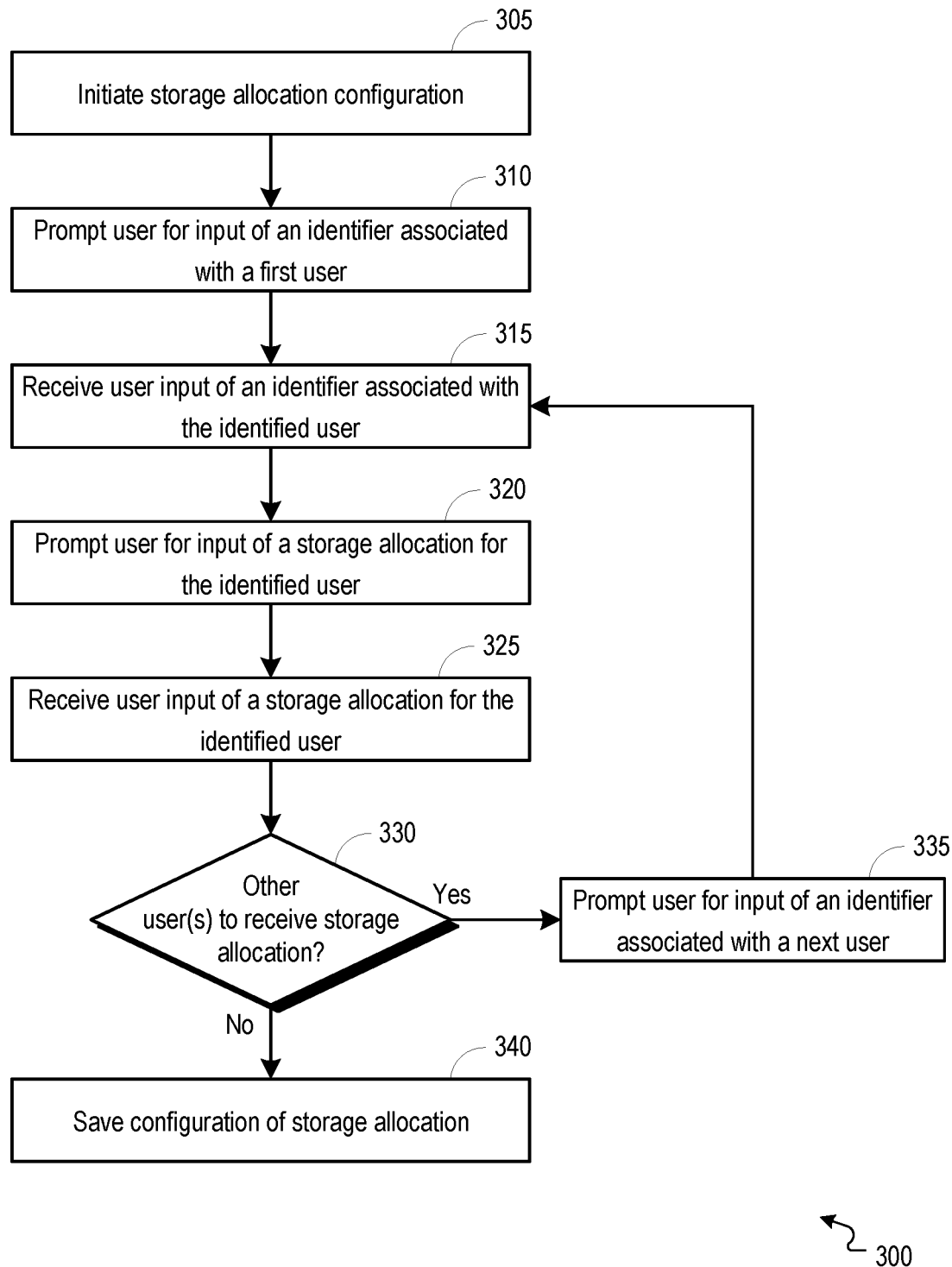
FIG. 3 is a flowchart illustrating an example process operable to facilitate a configuration of digital video recorder storage allocation.

FIG. 3 is a flowchart illustrating an example process 300 operable to facilitate a configuration of digital video recorder storage allocation. The process 300 can begin at 305, when a configuration of storage allocation is initiated. In embodiments, configuration of DVR storage (e.g., content storage 210 of FIG. 2) allocation may be initiated at a multimedia device 110 of FIG. 1. For example, configuration of DVR storage allocation may be initiated at the multimedia device 110 in response to a request received from a user. A user may interact with the multimedia device 110 (e.g., through a control interface 220 of FIG. 2) to initiate the configuration of DVR storage allocation.

At 310, a user may be prompted for input of an identifier associated with a first user. In embodiments, the prompt may be output from the multimedia device 110 (e.g., by the storage allocation module 225 of FIG. 2) to a display (e.g., display device connected to or otherwise associated with the multimedia device 110). For example, a graphical user interface (GUI) may be displayed at a display or display device associated with the device through which the user initiated the storage allocation configuration (e.g., multimedia device 110, client device 120 of FIG. 1, etc.). The GUI may provide the user with an option to input a user identifier.

At 315, a user input of an identifier associated with the identified user (e.g., the first user, next user, etc.) may be received in response to the prompt output from the multimedia device 110. In embodiments, the user input may include a unique identifier associated with a specific user (e.g., a name, title, etc.) or a specific user device (e.g., device name, or other identifier such as a MAC (media access control) address).

At 320, a user may be prompted for input of a storage allocation for the user associated with the input identifier. In embodiments, the prompt may be output from the multimedia device 110 (e.g., by the storage allocation module 225 of FIG. 2) to a display (e.g., display device connected to or otherwise associated with the multimedia device 110). For example, a graphical user interface (GUI) may be displayed at a display or display device associated with the device through which the user initiated the storage allocation configuration (e.g., multimedia device 110, client device 120 of FIG. 1, etc.). The GUI may provide the user with an option to input an amount or percentage of storage to be allocated to the identified user.

At 325, a user input of a storage allocation for the identified user may be received in response to the prompt output from the multimedia device 110. In embodiments, the storage allocation may include a specified amount or percentage of storage (e.g., DVR storage such as content storage 210) that is to be allocated to the identified user.

At 330, a determination may be made whether one or more other users are to receive an allocation of storage. In embodiments, the multimedia device 110 may output a prompt (e.g., by the storage allocation module 225 of FIG. 2) to a display, wherein the prompt asks the user whether there are any additional users that are to receive an allocation of storage (e.g., DVR storage such as content storage 210). The multimedia device 110 may determine whether one or more other users are to receive an allocation of storage based on a response to the prompt received from a user.

If, at 330, the determination is made that one or more other users are to receive an allocation of storage, the process 300 may proceed to 335. At 335, a user may be prompted for input of an identifier associated with a next user. In embodiments, the prompt may be output from the multimedia device 110 (e.g., by the storage allocation module 225 of FIG. 2) to a display (e.g., display device connected to or otherwise associated with the multimedia device 110). After prompting the user for input of an identifier associated with a next user, user input of an identifier associated with the next user may be received at 315.

If, at 330, the determination is made that no other users are to receive an allocation of storage, the process 300 may proceed to 340. At 340, the configuration of storage allocation may be saved. In embodiments, storage allocation designated for each of one or more users may be saved by the storage allocation module 225. The storage allocation module 225 may partition storage (e.g., DVR storage such as content storage 210) based on the storage allocations indicated by the user input. For example, content storage 210 may be partitioned such that each partition is designated for storing recordings initiated by an associated user, and each partition may be sized according to a storage allocation given to the associated user.

Figure 4:
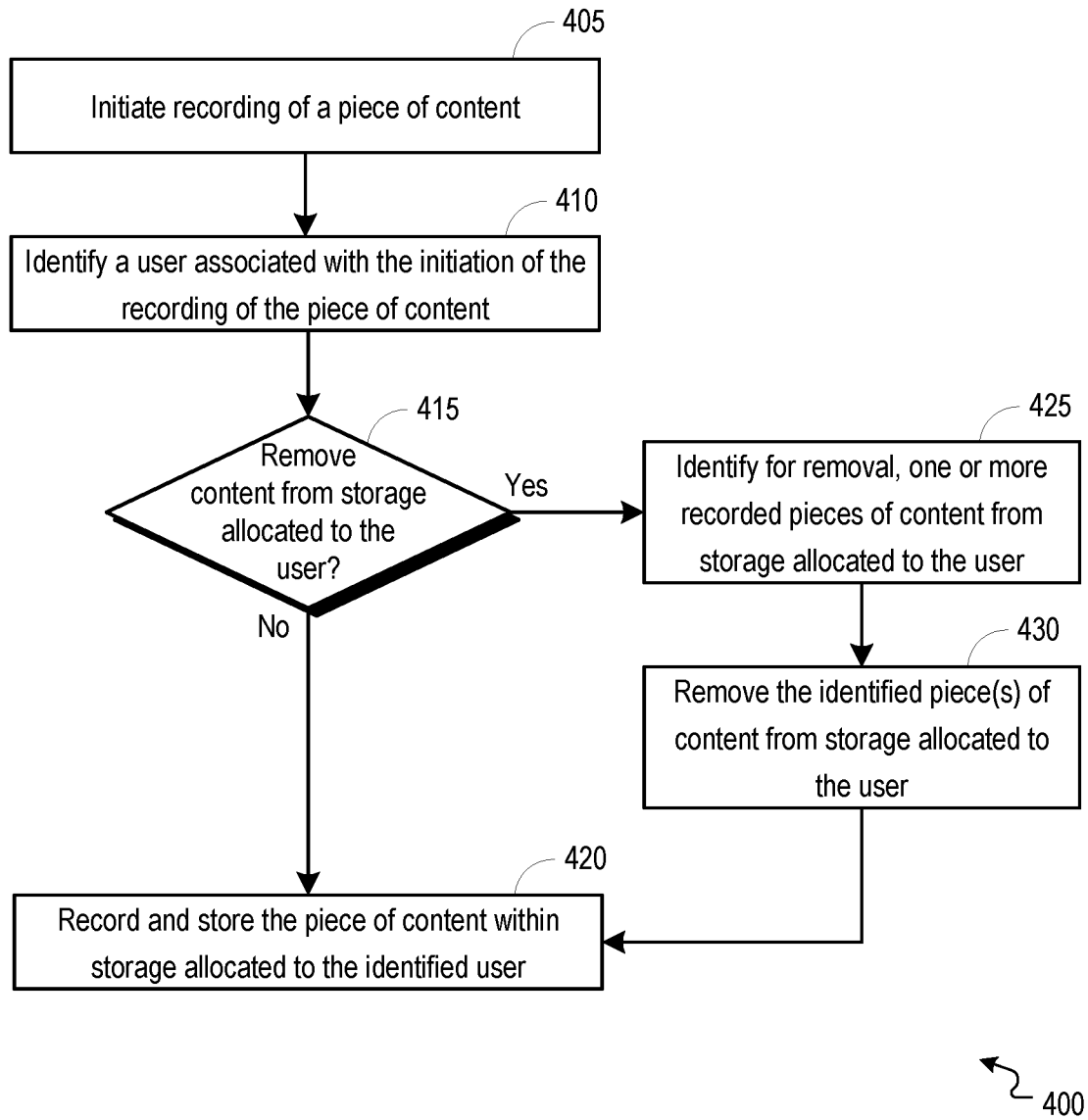
FIG. 4 is a flowchart illustrating an example process operable to facilitate device storage management based on an amount of storage allocated to a user.

FIG. 4 is a flowchart illustrating an example process 400 operable to facilitate storage management based on an amount of storage allocated to a user. The process 400 can begin at 405, when a recording of a piece of content is initiated. For example, the recording may be initiated in response to a received command from a user requesting an immediate initiation of a recording or may be initiated in response to a previously received command from a user requesting a scheduling of a recording to take place at a future time. It should be understood that various other ways may exist for a user to establish a recording of a piece of content. In embodiments, a multimedia device 110 of FIG. 1 may receive a user request that a piece of content be recorded by the multimedia device 110 (e.g., a user request to create a recording of a piece of content is received by the multimedia device 110). For example, a user may select a piece of content from a guide or list of upcoming or currently received programs and designate the piece of content for recording, or the user may initiate a recording of a piece of content that is currently being viewed by the user.

At 410, a user associated with the initiation of the recording (i.e., a user associated with a received user command) may be identified. The user associated with the initiation of the recording may be identified, for example, by a storage allocation module 225 of FIG. 2. In embodiments, the storage allocation module 225 may identify the user based on an identifier carried by the user command, a user input identifying the user, an identification of a device (e.g., client STB, mobile device, etc.) from which the user command is received, wherein the device is associated with a certain user, a determination that a client device (e.g., mobile device, tablet, wearable device, etc.) associated with a specific user is within a predetermined proximity of the multimedia device 110, and other user-identification methods. It will be appreciated by those skilled in the relevant art that various methods may be used for identifying a specific user that is responsible for requesting a recording of a piece of content at a multimedia device 110. It should be understood that the user may be identified from a message carrying the request for initiation of the recording or may be identified from storage wherein information associated with a previously received message establishing the scheduling of a recording is stored.

At 415, a determination may be made whether content should be removed from storage allocated to the identified user. The determination whether content should be removed from storage allocated to the identified user may be made, for example, by the storage allocation module 225. In embodiments, the determination whether content should be removed may be based upon a determination of the amount of space available in the storage allocated to the identified user. For example, the storage allocation module 225 may determine the portion or percentage of storage allocated to the user that is occupied by stored recordings or other data, and if the portion or percentage of the storage occupied by recordings or other data is greater than a predetermined threshold (e.g., 90%, 95%, 97%, or other predetermined portion or percentage), the storage allocation module 225 may determine that content should be removed from the storage that is allocated to the user. As another example, the storage allocation module 225 may compare the size of available storage in the portion of storage allocated to the user to the size of the piece of content that is to be recorded, and if the size of the piece of content to be recorded is greater than the size of available storage, the storage allocation module 225 may determine that content should be removed from the storage allocated to the user. It should be understood that the determination whether content should be removed from storage allocated to the user may be made before initiating the requested recording, or may be made periodically during the recording of the piece of content.

If, at 415, the determination is made that content does not need to be removed from storage allocated to the identified user, the process 400 may proceed to 420. At 420, the piece of content may be recorded and stored within storage allocated to the identified user. For example, the piece of content may be recorded by a recording module 230 of FIG. 2 and the recording may be stored within a portion of content storage 210 of FIG. 2 that is allocated to the identified user.

If, at 415, the determination is made that content should be removed from storage allocated to the identified user, the process 400 may proceed to 425. At 425, one or more recorded pieces of content may be identified for removal from storage allocated to the identified user. The one or more recorded pieces of content may be identified, for example, by a storage allocation module 225. For example, the storage allocation module 225 may identify and remove the oldest pieces of content from the storage allocated to the user. It should be understood that the storage allocation module 225 may be configured to identify pieces of content for removal from storage based on various other criteria (e.g., user preferences or favorites, size of content, type of content, etc.). It should be further understood that the number of recordings identified for removal may be based upon the amount of space needed to store the requested recording.

At 430, the one or more identified pieces of content may be removed from storage allocated to the identified user. For example, a storage allocation module 225 may remove the one or more identified pieces of content from a portion of storage (e.g., content storage 210) that is allocated to the identified user. After removing the one or more pieces of content from storage allocated to the identified user, the requested piece of content may be recorded and stored within the storage allocated to the identified user at 420.

Figure 5:
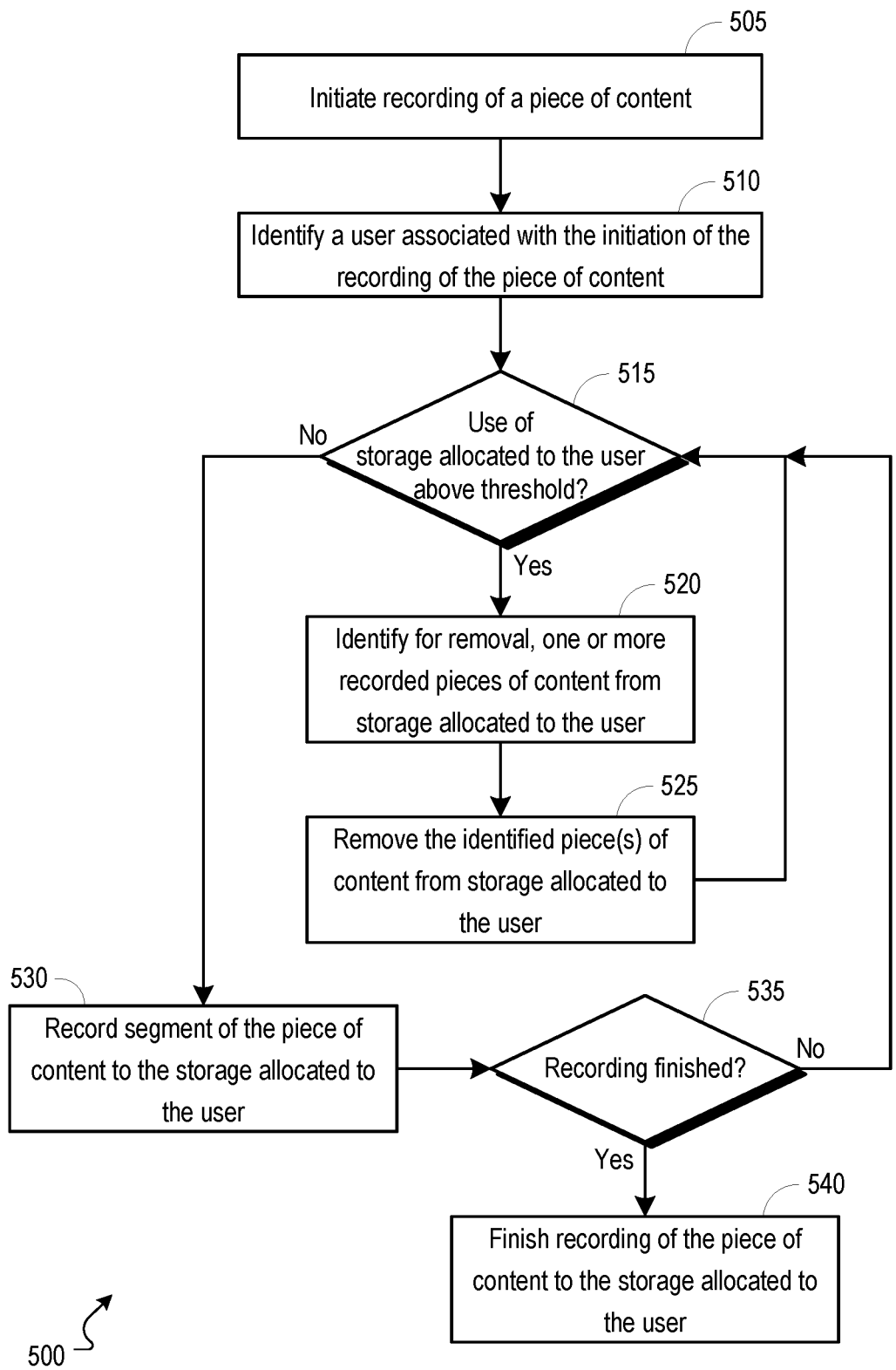
FIG. 5 is a flowchart illustrating an example process operable to facilitate the management of storage allocated to a user during a recording of a piece of content that was established by the user.

FIG. 5 is a flowchart illustrating an example process 500 operable to facilitate the management of storage allocated to a user during a recording of a piece of content that was established by the user. The process 500 can begin at 505, when a recording of a piece of content is initiated. For example, the recording may be initiated in response to a received command from a user requesting an immediate initiation of a recording or may be initiated in response to a previously received command from a user requesting a scheduling of a recording to take place at a future time. It should be understood that various other ways may exist for a user to establish a recording of a piece of content. In embodiments, a multimedia device 110 of FIG. 1 may receive a user request that a piece of content be recorded by the multimedia device 110 (e.g., a user request to create a recording of a piece of content is received by the multimedia device 110). For example, a user may schedule a future recording by selecting a piece of content from a guide or list of upcoming or currently received programs and designate the piece of content for recording, or the user may initiate an immediate recording of a piece of content by selecting an option to record a piece of content that is currently being streamed to a recording device or that is currently being viewed by the user.

At 510, a user associated with the initiation of the recording (i.e., a user associated with a received user command) may be identified. The user associated with the initiation of the recording may be identified, for example, by a storage allocation module 225 of FIG. 2. In embodiments, the storage allocation module 225 may identify the user based on an identifier carried by the user command, a user input identifying the user, an identification of a device (e.g., client STB, mobile device, etc.) from which the user command is received, wherein the device is associated with a certain user, a determination that a client device (e.g., mobile device, tablet, wearable device, etc.) associated with a specific user is within a predetermined proximity of the multimedia device 110, and other user-identification methods. It will be appreciated by those skilled in the relevant art that various methods may be used for identifying a specific user that is responsible for requesting a recording of a piece of content at a multimedia device 110. It should be understood that the user may be identified from a message carrying the request for initiation of the recording or may be identified from storage wherein information associated with a previously received message establishing the scheduling of a recording is stored.

At 515, a determination may be made whether use of storage allocated to the identified user is above a threshold level. The determination whether use of storage allocated to the identified user is above a threshold level may be made, for example, by the storage allocation module 225. In embodiments, a determination whether content should be removed from storage allocated to the user may be based upon a determination of the amount of space available in the storage allocated to the identified user. For example, the storage allocation module 225 may determine the portion or percentage of storage allocated to the user that is occupied by stored recordings or other data, and if the portion or percentage of the storage occupied by recordings or other data is greater than a predetermined threshold (e.g., 90%, 95%, 97%, or other predetermined portion or percentage), the storage allocation module 225 may determine that content should be removed from the storage that is allocated to the user. It should be understood that the determination whether use of storage allocated to the identified user is above a threshold may be made before initiating the requested recording, or may be made periodically during the recording of the piece of content.

If, at 515, the determination is made that the use of storage allocated to the identified user is above a threshold level, the process 500 may proceed to 520. At 520, one or more recorded pieces of content may be identified for removal from storage allocated to the identified user. The one or more recorded pieces of content may be identified, for example, by a storage allocation module 225. For example, the storage allocation module 225 may identify and remove the oldest pieces of content from the storage allocated to the user. It should be understood that the storage allocation module 225 may be configured to identify pieces of content for removal from storage based on various other criteria (e.g., user preferences or favorites, size of content, type of content, etc.). It should be further understood that the number of recordings identified for removal may be based upon the amount of space needed to store the requested recording.

At 525, the one or more identified pieces of content may be removed from storage allocated to the identified user. For example, a storage allocation module 225 may remove the one or more identified pieces of content from a portion of storage (e.g., content storage 210) that is allocated to the identified user. After removing the one or more pieces of content from storage allocated to the identified user, a determination may be made whether use of the storage allocated to the identified user remains above the predetermined threshold.

Returning to 515, if the determination is made that the use of storage allocated to the identified user is not above a threshold level, the process 500 may proceed to 530. At 530, one or more segments of the piece of content may be recorded and stored within storage allocated to the identified user. For example, the piece of content, or a segment or portion of the piece of content, may be recorded by a recording module 230 of FIG. 2 and the recording may be stored within a portion of content storage 210 of FIG. 2 that is allocated to the identified user.

At 535, a determination may be made whether the recording of the piece of content is finished. The determination whether the recording of the piece of content is finished may be made, for example, by the storage allocation module 225. In embodiments, the storage allocation module 225 may periodically (e.g., after a certain duration of time or after a certain portion of a piece of content is recorded) check the space available in storage allocated to the identified user while a piece of content is being recorded and stored at the storage allocated to the user. For example, if at 535, the recording of the piece of content is not finished, the determination whether use of the storage allocated to the identified user is above the threshold may be made at 515.

If, at 535, the determination is made that the recording of the piece of content is finished, the process 500 may proceed to 540 where the recording of the piece of content to storage allocated to the identified user may be finished. For example, the completed recording may be stored at a portion of content storage 210 of FIG. 2 allocated to the identified user.

Figure 6:
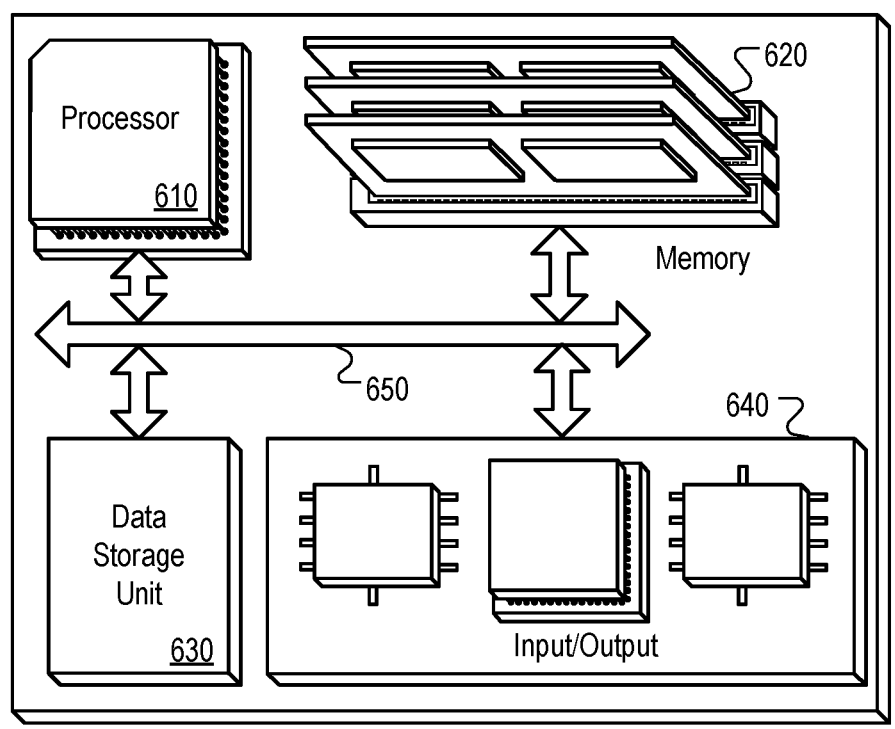
FIG. 6 is a block diagram of a hardware configuration operable to facilitate the allocation of digital video recorder storage.

FIG. 6 is a block diagram of a hardware configuration 600 operable to facilitate the allocation of digital video recorder storage. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a multimedia device 110 of FIG. 1 (e.g., access point, gateway device, STB, DVR or other content storage device, cable modem, router, wireless extender, or other access device) or client device 120 of FIG. 1 (e.g., STB, computer, television, tablet, mobile device, etc.). In another implementation, the input/output device can include driver devices configured to send communications to, and receive communications from one or more networks (e.g., WAN 130 of FIG. 1, local network, provider network 140 of FIG. 1, etc.).

Those skilled in the art will appreciate that the invention described herein improves upon methods and systems for storing media based on an identification of a requesting user. Methods, systems, and computer readable media may be operable to facilitate the allocation of digital video recorder storage. Storage for a device such as a digital video recorder may be partitioned into a plurality of segments, and each segment may be allocated to a specified user. The device may be configured to allocate a specified amount or percentage of storage to each one of a plurality of users. When a request to record a piece of content is received by the device, the device may identify the user requesting the recording, and the piece of content may be recorded and stored within a portion of device storage that is allocated to the user. If there is not enough room in storage allocated to the user to store the requested content, the device may identify and remove one or more recordings from the portion of storage allocated to the user.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving, at a multimedia device, a request to create a recording of a piece of content, wherein the request to create the recording of the piece of content is received from a control device;
   identifying a user associated with the request, wherein the user associated with the request is identified based upon a determination that a device associated with the user is within a predetermined proximity of the multimedia device;
   determining whether a use of a portion of media storage allocated to the user is above a threshold amount, wherein the portion of media storage is allocated to the user based upon a user input of an amount of storage to be allocated to the user, wherein the user input comprises both an identification of the amount of storage to be allocated to the user and an identification of the device associated with the user, and wherein the user input is received during a configuration of storage allocation;
   if use of the portion of media storage allocated to the user is above the threshold amount:
   identifying for removal, one or more recordings stored in the portion of media storage allocated to the user, wherein the one or more recordings are identified for removal based upon the size of available storage in the portion of media storage allocated to the user, the size of each individual one of the one or more recordings, and a content type associated with each individual one of the one or more recordings;
   removing the identified one or more recordings from the portion of media storage allocated to the user; and
   storing a recording of a first segment of the piece of content in the media storage allocated to the user;
   if use of the portion of media storage allocated to the user is not above the threshold amount, storing the recording of the first segment of the piece of content in the media storage allocated to the user;
   after storing the recording of the first segment of the piece of content, determining whether a use of a portion of media storage allocated to the user is above the threshold amount;
   if use of the portion of media storage allocated to the user is above the threshold amount:
   identifying for removal, one or more recordings stored in the portion of media storage allocated to the user, wherein the one or more recordings are identified for removal based upon the size of available storage in the portion of media storage allocated to the user, the size of each individual one of the one or more recordings, and a content type associated with each individual one of the one or more recordings;
   removing the identified one or more recordings from the portion of media storage allocated to the user; and
   storing a recording of a next segment of the piece of content in the media storage allocated to the user;
   if use of the portion of media storage allocated to the user is not above the threshold amount, storing the recording of the next segment of the piece of content in the media storage allocated to the user.

2. The method of claim 1, wherein the media storage comprises digital video recorder (DVR) storage.

3. The method of claim 1, wherein the media storage comprises network digital video recorder (nDVR) storage.

4. The method of claim 1, wherein the portion of media storage allocated to the user is established based upon user input allocating a portion of the media storage to each one of a plurality of users.

5. An apparatus comprising:
   an interface configured to be used to receive a request to create a recording of a piece of content, wherein the request to create the recording of the piece of content is received from a control device;
   one or more modules configured to:
   identify a user associated with the request, wherein the user associated with the request is identified based upon a determination that a device associated with the user is within a predetermined proximity of the multimedia device;
   determine whether a use of a portion of media storage allocated to the user is above a threshold amount, wherein the portion of media storage is allocated to the user based upon a user input of an amount of storage to be allocated to the user, wherein the user input comprises both an identification of the amount of storage to be allocated to the user and an identification of the device associated with the user, and wherein the user input is received during a configuration of storage allocation;
   if use of the portion of media storage allocated to the user is above the threshold amount:
   identify for removal, one or more recordings stored in the portion of media storage allocated to the user, wherein the one or more recordings are identified for removal based upon the size of available storage in the portion of media storage allocated to the user, the size of each individual one of the one or more recordings, and a content type associated with each individual one of the one or more recordings;
   remove the identified one or more recordings from the portion of media storage allocated to the user; and
   store a recording of a first segment of the piece of content in the media storage allocated to the user;
   if use of the portion of media storage allocated to the user is not above the threshold amount, store the recording of the first segment of the piece of content in the media storage allocated to the user;
   after storing the recording of the first segment of the piece of content, determine whether a use of a portion of media storage allocated to the user is above the threshold amount;
   if use of the portion of media storage allocated to the user is above the threshold amount:
   identify for removal, one or more recordings stored in the portion of media storage allocated to the user, wherein the one or more recordings are identified for removal based upon the size of available storage in the portion of media storage allocated to the user, the size of each individual one of the one or more recordings, and a content type associated with each individual one of the one or more recordings;
   remove the identified one or more recordings from the portion of media storage allocated to the user; and
   store a recording of a next segment of the piece of content in the media storage allocated to the user;
   if use of the portion of media storage allocated to the user is not above the threshold amount, store the recording of the next segment of the piece of content in the media storage allocated to the user.

6. The apparatus of claim 5, wherein the media storage comprises digital video recorder (DVR) storage.

7. The apparatus of claim 5, wherein the media storage comprises network digital video recorder (nDVR) storage.

8. One or more non-transitory computer readable media having instructions operable to cause one or more processors to perform the operations comprising:
receiving, at a multimedia device, a request to create a recording of a piece of content, wherein the request to create the recording of the piece of content is received from a control device;
identifying a user associated with the request, wherein the user associated with the request is identified based upon a determination that a device associated with the user is within a predetermined proximity of the multimedia device;
determining whether a use of a portion of media storage allocated to the user is above a threshold amount, wherein the portion of media storage is allocated to the user based upon a user input of an amount of storage to be allocated to the user, wherein the user input comprises both an identification of the amount of storage to be allocated to the user and an identification of the device associated with the user, and wherein the user input is received during a configuration of storage allocation;
if use of the portion of media storage allocated to the user is above the threshold amount:
identifying for removal, one or more recordings stored in the portion of media storage allocated to the user, wherein the one or more recordings are identified for removal based upon the size of available storage in the portion of media storage allocated to the user, the size of each individual one of the one or more recordings, and a content type associated with each individual one of the one or more recordings;
removing the identified one or more recordings from the portion of media storage allocated to the user; and
storing a recording of a first segment of the piece of content in the media storage allocated to the user;
if use of the portion of media storage allocated to the user is not above the threshold amount, storing the recording of the first segment of the piece of content in the media storage allocated to the user;
after storing the recording of the first segment of the piece of content, determining whether a use of a portion of media storage allocated to the user is above the threshold amount;
if use of the portion of media storage allocated to the user is above the threshold amount:
identifying for removal, one or more recordings stored in the portion of media storage allocated to the user, wherein the one or more recordings are identified for removal based upon the size of available storage in the portion of media storage allocated to the user, the size of each individual one of the one or more recordings, and a content type associated with each individual one of the one or more recordings;
removing the identified one or more recordings from the portion of media storage allocated to the user; and
storing a recording of a next segment of the piece of content in the media storage allocated to the user;
if use of the portion of media storage allocated to the user is not above the threshold amount, storing the recording of the next segment of the piece of content in the media storage allocated to the user.

9. The one or more non-transitory computer-readable media of claim 8, wherein the media storage comprises digital video recorder (DVR) storage.

10. The one or more non-transitory computer-readable media of claim 8, wherein the media storage comprises network digital video recorder (nDVR) storage.

11. The one or more non-transitory computer-readable media of claim 8, wherein the portion of media storage allocated to the user is established based upon user input allocating a portion of the media storage to each one of a plurality of users.

* * * * *